United States Patent Office 3,423,351
Patented Jan. 21, 1969

3,423,351
MONODISPERSE LATICES AND PROCESS FOR
PREPARING SAME
Percy E. Pierce, University Heights, and Richard M.
Holsworth, Westlake, Ohio, assignors, by mesne assignments, to SCM Corporation, New York, N.Y., a corporation of New York
No Drawing. Filed Aug. 30, 1965, Ser. No. 483,735
U.S. Cl. 260—29.6                          12 Claims
Int. Cl. C08f 1/13; C08d 1/09

ABSTRACT OF THE DISCLOSURE

An improvement in an emulsion polymerization process whereby concentrated aqueous suspension of polymer particles having a uniform particle size or diameter has been discovered and is described. A method whereby the uniform particle size of aqueous suspension of polymer particles can be selected and determined prior to polymerization of an aqueous emulsion of a polymerizable liquid is also described.

The improvement is in a process in which a quantity of water-emulsifiable, polymerizable organic liquid, having carbon-carbon unsaturation and restricted water solubility is polymerized in a disperse state in a volume of aqueuos medium containing an anionic surfactant and a nonionic surfactant under emulsion polymerization conditions to form a suspension having a continuous aqueous phase and from about 30 to 60 weight percent, basis the weight of the suspension of a disperse phase consisting essentially of polymer particles. The improvement is for making polymer particles of virtually uniform particle diameter (D) and comprises establishing an emulsion of said polymerizable liquid in said volume of aqueous medium wherein the emulsion or dispersion has a polymerizable liquid:anionic surfactant weight ratio (R) of about 20:1 to 1200:1 and contains between about 1 and about 4 weight percent, basis the weight of the suspension, of said non-ionic surfactant and simultaneously heating the total volume of said emulsion at a temperature in the range of between 45° C. and about 75° C.

The present invention relates to an improvement in emulsion polymerization process. The present invention more particularly relates to a process for directly and economically producing concentrated aqueous suspensions of polymer particles having a substantially uniform particle diameter (e.g., particle size). By one aspect of this invention it is also possible to prepare aqueous suspensions of polymer particles whereby the substantially uniform particle diameter of the polymer particles can be determined prior to polymerization.

Use of the present invention makes possible the practical, large-scale production of aqueous suspensions of polymer particles having a substantially uniform particle diameter (sometimes hereinafter referred to as "monodisperse suspensions" or "monodisperse latices") which are useful (1) as particle size gauges for determining the particles size of a wide variety of finely-divided particulate materials and (2) for permitting control of the properties of finished structural articles such as films or filaments which are dependent upon the particle size and particle size distribution of the polymer particles in the aqueous suspension. Suspensions prepared by various process embodiments of this invention are further advantageous in that aqueous suspensions of polymer particles (sometimes hereinafter referred to as "latices") having controlled particle size differentials and/or controlled softening point differentials can be blended and the blends used to make masses and/or films of controlled density, fusibility and porosity. Films produced from aqueous monodisperse suspensions of polymer particles are also highly decorative due to certain refraction-reflection phenomena which occur when the films are in ordinary light.

Commercially prepared emulsion polymerization products are polydisperse; that is, the polymer particles in a single suspension can vary in diameter from about several hundred up to about several thousand A. In the past, aqueous suspensions of polymer particles having a more uniform particle size than polydisperse suspensions have been prepared by processes in which relatively small quantities (e.g., up to about 40 weight percent, basis the weight of the final suspension) of polymerizable organic liquids have been polymerized under liquid phase conditions in relatively large volumes of water in the presence of a relatively insoluble soap (e.g., lithium stearate). Such suspensions of polymer particles have also been prepared by processes sometimes referred to as "seeding" wherein additional polymerizable liquids are added to aqueous suspensions of pre-formed polydisperse suspensions of polymer particles. The pre-formed polymer particles are made somewhat more uniform in diameter by the further polymerization of the added polymerizable liquid in or on the surfaces of the pre-formed particles. The foregoing processes are disadvantageous in that they require expensive control equipment and prolonged polymerization times. Moreover, the suspensions of polymer particles prepared by these procedures tend to be unstable and tend to coagulate into a gel, paricularly at commercially attractive high concentrations.

The present invention provides an improvement in a conventional emulsion polymerization process wherein a quantity of a water-emulsifiable, polymerizable organic liquid having carbon-carbon unsaturation and restricted water solubility is polymerized in a disperse state in a volume of an aqueous medium containing an anionic surfactant and a non-ionic surfactant under emulsion polymerization conditions to form a suspension having a continuous aqueous phase and from about 30 to about 60 weight percent, basis the weight of the suspension, of a disperse phase consisting essentially of polymer particles. In accordance with the present invention the improvement is for making polymer particles of virtually uniform diameter (D) within the range of from between about 750 to about 5,000 A., and comprises conducting the polymerization at a temperature in the range of from about 45° C. to about 75° C. in the presence of (i) An anionic surfactant in a concentration sufficient to provide in the aqueous medium, after dispersion therein of the polymerizable liquid, a polymerizable liquid: anionic surfactant weight ratio (R) of between about 20:1 and 1200:1, and (ii) Between about 1 and about 4 weight percent, basis the weight of the suspension, of a non-ionic surfactant, the non-ionic surfactant having a hydrophile-lypophile balance between about 10 and about 15.

By so proceeding stable aqueous suspensions, some of which can contain up to as much as about 60 weight percent of polymer particles having a substantially uniform particle diameter (sometimes hereinafter referred to as "monodisperse latices") can be readily and economically prepared.

The particle diameter of the polymer particles in an aqueous suspension can be readily determined by electron-microscopy techniques according to the procedure described by S. H. Maron in the Journal of Applied Physics, vol. 23, p. 900, in August 1952. In determining the uniformity of particle diameter; that is, whether a suspension of polymer particles is monodisperse or polydisperse, the average weight diameter ($D_w$) is divided by the average number diameter ($D_n$). When the ratio $D_w/D_n$ is 1.0000, ideal monodispersity is present and all or substantially all of the polymer particles have the same particle diameter. The values $D_w$ and $D_n$ are determined in accordance with the procedures described by Loranger, et al. in the "Official Digest" of the Proceedings of the Paint Research Institute, pp. 10 and 11, published in April 1959. For the purposes of this invention, aqueous suspensions of polymer particles are monodisperse when the $D_w/D_n$ ratio is from 1.000 to 1.04, preferably between 1.000 and 1.005.

As noted hereinbefore, the polymerizable liquid:anionic surfactant weight ratio (R) is between about 20:1 and about 1200:1. As will be hereinafter evident, the diameter of the polymer particles is regulated by the establishment of the weight ratio (R) and the particle diameter of the particles in the finished suspension, and R will vary directly with the particle size. Thus, for example, when R is low (e.g., from about 20:1 to about 50:1), the diameter of the particles in the aqueous suspension will be small; for example, from between about 700 to about 1,500 A. When R is above about 50:1 but less than about 500:1, the particle diameter of the polymer particles will be in the range of from about 1,500 to about 3,000 A. When R is greater than about 500:1 the particle diameter of the polymer particles will be above about 3,000 A., and when R is about 1200:1 the particles will often have a diameter as large as about 5,000 A.

The particular surfactant employed also affects to some extent the particle size, and the weight ratio (R) will vary between particular anionic surfactants to provide a specific particle diameter. However, where a particular anionic surfactant is used, the smaller the value of R the smaller will be the particle diameter of the polymer particles in the finished aqueous suspension, and, conversely, the larger the value of R the larger will be the diameter of the polymer particles.

If the polymerizable liquid:anionic surfactant weight ratio is less than about 20:1, the resultant aqueous suspension will usually be polydisperse; that is, the particle diameter of the particles will be non-uniform. Although R may be greater than about 1200:1 in certain embodiments of the processes of this invention (wherein monodisperse suspensions are produced), polymerization times are usually unduly prolonged and the polymer particles will sometimes tend to separate from the aqueous phase.

As previously noted, the emulsion polymerization is conducted at a temperature in the range of from about 45° C. to about 75° C. Although temperatures below about 45° C. may be employed, cooling of the reaction mixture is required due to the exotherm produced by the polymerization of the polymerizable liquid, requiring expensive equipment and process variation due to the difficulty of maintaining the temperature constant. Although temperatures above about 75° C. may be employed, some polymerizable liquids volatilize above this temperature and expensive pressurized reaction vessels often are required. Temperatures within the range of from about 45° C. to about 75° C. are both economical and advantageous in that substantially constant reaction conditions can be maintained during the emulsion polymerization process.

Generally, for a particular polymerizable liquid:anionic surfactant weight ratio, the higher temperatures will result in particles having a somewhat smaller diameter, and lower temperatures will result in polymer particles having a somewhat larger particle diameter. In other words, the size of the resulting polymer particles is regulated by establishing the temperature in a direction opposite from the particle diameter desired in the finished suspension.

As hereinbefore stated, the polymerization is conducted in the presence of from about 1 to about 4%, by weight, based on the weight of the suspension, of a hereinafter defined non-ionic surfactant having a hydrophile-lypophile balance between about 10 and about 15. If less than about 1% non-ionic surfactant is employed, the resulting suspension of polymer particles will often by physically unstable; that is, the particles will tend to coalesce and/or flocculate, particularly where the polymer particles have smaller particle diameters. If more than about 4% by weight of such non-ionic surfactant is employed, the resulting aqueous suspension will usually be polydisperse and the polymer particles therein will have varying diameters. The amount of non-ionic surfactant employed (within the above-defined range) will generally vary with the concentration of polymer particles in the final suspension and with the particle size of the particles therein, the higher concentration of non-ionic surfactant corresponding to higher concentrations and smaller particle size of the polymer particles.

As aforenoted, the non-ionic surfactant employed has a hydrophile-lypophile balance (hereinafter defined) between about 10 and about 15. If the hydrophile-lypophile balance is below about 10 the resulting suspensions will often be unstable and tend to form gels on standing. If the hydrophile-lypophile balance of the non-ionic surfactant is above about 15 the resulting suspension will usually be polydisperse.

The term "hydrophile-lypophile balance" (sometimes hereinafter referred to as "HLB") as used herein is a calculated value for determining the hydrophile-lypophile balance of surfactants. When the surfactant is a fatty acid ester of a polyhydric alcohol, the formula used for the calculation is as follows:

$$HLB = 20(1 - S/A)$$

wherein S equals the saponification number of the ester and A equals the acid number of the fatty acid. Where the surfactant is an ethylene oxide polyol-condensation product, the formula used to calculate the HLB is $$HLB = \frac{E+P}{5}$$

where E is the weight percent of ethylene oxide and P is the weight percent of the polyol content. The hydrophile-lypophile balance and methods for the calculation thereof are defined and described in detail in Technical Bulletin LD–97–IOM–9–62, published by Atlas Chemical Industries, and in the Journal of the Society of Cosmetic Chemists, vol. 1, pp. 311–326 (1949), and in the American Perfumer, pp. 26–29, published May 1955.

As noted hereinbefore and as will be apparent from Example 11, it has been found possible, in the practice of a process of this invention, to preselect or predetermine the diameter of the polymer particle, and to make aqueous suspensions of polymer particles having a predetermined particle diameter. This can be accomplished by maintaining otherwise substantially constant conditions (e.g., specific temperature, specific polymerizable liquid, specific anionic surfactant, and specific non-ionic surfactant) and correlating particle size (D) with the polymerizable liquid:anionic surfactant weight ratio (R), and by plotting the logarithms of a plurality of corresponding experimental values of D and R, thereby obtaining a substantially linear plot from which, by extrapolation or interpolation, the preselected diameter (D) which is obtainable from a given weight ratio (R) may be read directly from the plot.

Under these conditions the polymerizable liquid:anionic surfactant weight ratio is preferably between about 50:1 and about 1200:1, the lower weight ratios corresponding to smaller sized polymer particles and the higher weight ratios corresponding to larger sized polymer particles.

The polymerizable organic liquid having carbon-carbon unsaturation and restricted water solubility employed in the hereinbefore defined processes can be a monomer or a mixture of at least two monomers, and will depend on the character of the particular polymer particle desired.

The phrase "restricted water solubility" as used herein is intended to mean and to include certain monomers or mixtures thereof having a water solubility of about 1% or less. Thus, in the case of mixtures of monomers, it is sometimes possible to employ a monomer which is water-soluble in an amount greater than 1%; provided, however, that the total mixture of monomers has a total water solubility of 1% or less. If the polymerizable liquid has a water solubility in excess of 1%, monodisperse aqueous suspensions of polymer particles will not always be obtained. The monomers which, singly or in combination, comprise the polymerizable organic liquids which can be employed in the processes of this invention have carbon-to-carbon unsaturation (e.g., ethylenic or acetylenic unsaturation), and usually are liquid hydrocarbons or substituted liquid hydrocarbons having conjugated olefinic unsaturation. They include, for example, vinyl aromatic hydrocarbons and their counterparts wherein one or more hydrogen atoms are replaced by halogen atoms, amine, amide, imide, etc. groups; aliphatic hydrocarbons having a plurality of conjugated ethylenic double bonds, and esters of $\alpha,\beta$-unsaturated carboxylic acids, including, for example, monocarboxylic acids, esters and half esters of dicarboxylic acids, and partial to complete esters of tricarboxylic acids.

Examples of specific vinyl aromatic hydrocarbon monomers include styrene, $\alpha$-methyl styrene, $\alpha$-methyl-p-methyl styrene, p-methyl styrene, meta-ethyl styrene, p-isopropyl styrene, t-butyl styrene, vinyl napthalene, vinyl toluene, divinyl benzene and their counterparts wherein one or more hydrogen atoms are replaced by halogen atoms or radicals such as amine, amide, imide, etc. radicals.

Examples of advantageous aliphatic hydrocarbons having a plurality of conjugated ethylenic double bonds include, for example, conjugated polyolefins such as 1,3-butadiene, methyl-2-butadiene, 1,3-piperylene, 2,3-dimethyl butadiene, and cyclopentadiene, dicyclopentadiene and the like.

Examples of aliphatic hydrocarbons having acetylenic unsaturation, which may be employed as monomers in the processes of this invention, include, for example, ethylacetylene, dimethylacetylene, propylacetylene, ethylmethyl acetylene, butylacetylene, etc.

Advantageous esters of $\alpha,\beta$-unsaturated monocarboxylic acids include, for example, esters of acrylic, methacrylic, ethacrylic, cinnamic, atropic, and crotonic acids and their counterparts wherein one or more hydrogen atoms are replaced by atoms or molecules mentioned above.

Advantageous esters of $\alpha,\beta$-unsaturated di- and tricarboxylic acids include, for example, fumaric, maleic, and itaconic and aconitic acids. The foregoing mono-, di-, and tri-carboxylic acids may be full or partial esters when esterified with suitable hereinafter defined alcohols.

Examples of ester-forming alcohols which form esters with the above-described carboxylic acids include unsubstituted alcohols such as methyl, ethyl, propyl and isopropyl, n-butyl, t-butyl, sec-butyl, n-amyl, isoamyl, hexyl-2-ethyl, butyl and heptyl alcohols; 2-methyl pentanol, 3-methyl ethyl, n-octyl, 2-ethyl, hexyl, nonyl, decyl, dodecyl, tridecyl, tetradecyl, pentadecyl, hexadecyl, octadecyl, 3,5,5-trimethyl hexyl, and octadecenyl alcohols, substituted alkyl alcohols wherein one or more hydrogen atoms are substituted by halogen atoms. Other substituted alcohols include 2-methoxy ethyl, 2-ethoxy ethyl, 2-propoxy ethyl, 2-butoxy ethyl, 2-nitro-2-methyl propyl, dimethylaminoethyl alcohol, and the like. Cyclic alcohols include cyclohexanol and methylcyclohexanol. Aryl alcohols which form esters with the above-described carboxylic acids include phenol and its nuclear substitution products, halogenated phenols, cresols, naphthols, etc. Araliphatic alcohols include benzyl and substituted benzyl alcohols. Heterocyclic alcohols include furfuryl and tetrahydrofurfuryl alcohols. Preferred alcohols are lower alkyl and corresponding chloro-substituted lower alkyl alcohols which form esters with any of the hereinbefore described $\alpha,\beta$-unsaturated carboxylic acids.

Especially advantageous monomers include styrene, $\alpha$-methyl styrene, t-butyl styrene, divinyl benzene, 1,3-butadiene, isoprene, alkyl acrylates, including ethyl acrylate, butylacrylate, methyl methacrylate, vinylidene bromide, acrylonitrile, vinyl acrylate, vinyl crotonate, vinyl methacrylate, and mixtures thereof. Generally the aforedescribed monomers are among those polymerizable organic liquids conventionally employed in emulsion polymerization processes wherein polydisperse suspensions of polymer particles are obtained.

The anionic surfactant which can be employed in processes of this invention include metal salts of fatty acids such as, for example, alkali metal and alkaline earth metal salts of naturally occurring fatty aids (e.g., stearic, palmitic, oleic, lauric, myristic, arachidic, etc.) which are commonly referred to as soaps. Amino compounds of such fatty acids (e.g., alkylamines) may also be employed. Metal salts of sulfonated oils (e.g., turkey red oil), sulfonated alcohols, fatty alcohol sulfates, sulfonapthanates, petroleum sulfonates, aromatic sulfonates (e.g., sulfonated alkyl naphthalene), alkyl sulfo-succinic esters, aryl alkyl sulfonic acids, sulfonated amides, sulfonated phenols, and other sulfonated, phosphated or borated compounds corresponding to the foregoing may also be employed.

Other anionic surfactants include alkali metal salts of: sulfonated ricinoleic acid, tetrahydronapthalene sulfonic acid, propyl and butyl napthalene sulfonic acid, butyl ricinoleic acid sulfonate, sulfuric acid esters of alcohols from coconut oil; sulfonated fatty acid ethanol amides, polybutyl napthalene sulfonic acid, heptadecyl benzene sulfonic acid, secondary alcohol sulfonic acids, dioctyl sulfo-succinic acid, condensation products of fatty acids, and diethanolamine, alkyl benzene sulfonic acids, alkyl sulfonic acids, and the like.

Specifically advantageous anionic surfactants which may be employed include lithium soaps (e.g., lithium stearate, oleate or palmitate), alkali metal alcohol sulfate esters; for example, sodium lauryl sulfate and sodium lauryl sulfo-acetate; alkali metal salts of alkyl sulfonic acids; for example, alkali metal salts of alkyl benzene sulfonic acids in which the alkyl group contains from 8 to 22 carbon atoms; specifically, alkali metal alkyl sulfates and the alkali metal alkyl benzene sulfonates are preferred. Any of the foregoing anionic surfactants may be employed in the conventional manner of emulsion polymerization; provided, however, the polymerizable liquid: anionic surfactant weight ratio is within the ranges hereinbefore described.

The non-ionic surfactants employed as previously noted have a hydrophile-lypophile balance in the range of from about 10 to about 15. Non-ionic surfactants which can be employed include those represented by the following general structure:

$$[HOC_2H_4(OC_2H_4)_xO]_yR$$

where R is a non-ionic nucleus having lypophilic qualities, $y$ may be an integer of 1 or greater, but preferably has a value between 1 and 4, $x$ may have any value of 1 or more in any one oxyethylene chain, but the product $(x+1)y$ must provide a total of at least 8 oxyethylene groups. Stated differently, such non-ionic surfactants can be described as being reaction products of one or more polyoxyethylene glycols having a total of at least 8 oxyethylene groups with any compound which has the lypophilic qualities and which contains enough reactive monovalent substituents to be capable of reacting with and removing hydrogen from one hydroxyl group of each added polyoxyethylene glycol. Non-ionic surfactants having the foregoing properties, and, in addition, having a hydrophile-lypohile balance of between 10 and 15, may be employed in the processes of this invention.

Specific non-ionic surfactants having an HLB within 10 and 15 include, for example, a series of ethylene oxide condensation products prepared by the reaction of t-octyl phenol or nonylphenol with from 7 to 10 ethylene oxide groups and sold under the trademark "Triton" by the Rohm & Haas Company. Of these series of surfactants Triton X-45, X-155, X-100, X-102 and X-114 are particularly advantageous. Other specific surfactants include a polymerized oxyethylene condensate sold under the name of Igepal CA, a trademark of General Dyestuff Corporation; and a condensation product of ethylene oxide and an organic acid sold under the name of Emulfor ELA, a trademark of General Dyestuff Corporation; also, an organic acid and a polyoxyalkylene ether of partial stearic acid and oleic acid esters, sold under the trademark "Tween" 60, "Tween" 80 and "Tween" 81 by the Atlas Powder Company.

In addition to the anionic and non-ionic surfactants in the aqueous medium in which the polymerizable liquid is polymerized, such aqueous medium will also contain well-known conventional components such as, for example, an initiator and an electrolyte. The initiators employed are those conventionally used in the emulsion polymerization art and include, for example, inorganic peroxides such as hydrogen peroxide; inorganic per-salts such as alkali metal per-sulfates, per-carbonates and per-borates, and per-acids such as peracetic acid. The above initiators are water soluble and are generally preferred. However, substantially water-insoluble initiators which may sometimes be used in combination with the aforedescribed water-soluble initiators include organic peroxides such as urea peroxide, benzoyl peroxide, acetyl peroxide, acetone benzoyl peroxide, lauryl peroxide, acetone peroxide, and methyl ethyl ketone peroxide. The amount of such initiator can vary over a considerable range, and conventionally is from about 0.1 to about 2 weight percent, based on the weight of the polymerizable liquid which is added to the aqueous medium. Where the initiator is in itself an electrolyte, such as an inorganic per-salt which will be converted in situ to an electrolyte, the initiator may provide all or part of the electrolyte in the medium.

The electrolyte employed may be any water-soluble salt which will result in an electrically conductive medium. Preferred electrolytes are highly dissociated water-soluble metal salts of organic and inorganic acids (e.g., water-soluble alkali metal sulfates, carbonates, chlorides, phosphates, acetates, propionates and citrates). The amount of electrolyte is usually low, in the range of from about 0.003 to about 0.006 mol of electrolyte per liter of aqueous medium. Quite often anionic surfactants as commercially purchased will contain a sufficient amount of residual metal alkali salt and will provide sufficient electrolyte to the aqueous medium.

Immeriately prior to and/or during emulsion polymerization the reaction container which contains the process components is conventionally purged with an inert gas, preferably nitrogen for economic reasons, and the emulsion polymerization is carried out in an atmosphere of such inert gas. Such treatment is not critical but tends to shorten the polymerization time since atmospheric oxygen tends to prolong such time.

The following specific examples are intended to illustrate the invention but not to limit the scope thereof, parts and percentages being by weight unless otherwise specified.

Example 1

To a cylindrical 1.5 liter container equipped with heating and cooling coils, means for passing a purging gas stream through the contents of the container, and a mechanical stirrer, there were added the following ingredients in the order listed.

| Ingredients: | Parts by wt. (grams) |
| --- | --- |
| Water | 112.0 |
| Triton [1] X-100 | 4.0 |
| Ultrawet [2] K | 1.5 |
| $K_2S_2O_8$ | 0.7 |
| Styrene | 136.5 |

[1] A condensation product of polyethylene oxide and octyl phenol having 8 ethylene oxide groups per molecule—trademark of Rohm & Haas Co.
[2] Sodium dodecyl benzene sulfonate—trademark of Atlantic Refining Company.

Prior to and during the addition of styrene, which was added over a period of about 90 seconds, nitrogen gas was sparged through the container and the contents of the container were vigorously stirred. The stirring was continued for 4 hours until substantially all of the styrene had polymerized into distinct particles. During the polymerization the temperature of the contents of the container was maintained at 60° C. by means of a cooling coil.

The polystyrene particles in the resulting aqueous suspension were sampled and electron microphotographs made. The particles were substantially uniform in size and had a diameter of 2,530 A., determined by the method of Maron, et al. described in the Journal of Applied Physics, vol. 23, p. 900 (August 1952). The ratio of average weight diameter to average number diameter (described in Maron) was 1.001, demonstrating an excellent particle size uniformity of the particles in the suspension. The suspension, when exposed to ordinary light, was multi-hued, the colors being similar to those produced by light reflected from a diffraction grating, a further indication that the aqueous suspension consisted of monodisperse particles.

Example 2

To a cylindrical 1.5 liter container equipped with heating and cooling coils, means for passing a purging gas stream through the contents of the container, and a mechanical stirrer, there were added the following ingredients in the order listed.

| Ingredients: | Parts by wt. (grams) |
| --- | --- |
| Water | 82.0 |
| Triton X-100 | 3.0 |
| Lithium Stearate | 1.0 |
| $K_2S_2O_8$ | 0.5 |
| Styrene | 100.0 |

Nitrogen gas was sparged into the container and the solution was agitated during the addition of the styrene, which occurred over a 60-second period. The temperature of the contents in the container was permitted to rise to 50° C. and maintained throughout the polymerization, which took place over a 3½ hour period. The resulting aqueous suspension consisted of 53.7 weight percent suspension of polystyrene particles having a particle diameter of 2,550 A., the particle size being determined in accordance with the procedure of Example 1. The weight diameter:average number diameter ratio was 1.003, demonstrating excellent particle size uniformity in which substantially 99.5% of the particles in the suspension had a diameter of between 2,530 and 2,570 A. The color of the suspension was similar to that of Example 1.

Example 3

To the container described in Example 1 there were added the following ingredients in the order listed.

| Ingredients: | Parts by wt. (grams) |
| --- | --- |
| Water | 112.00 |
| Triton X-100 | 4.00 |
| G 3300 [1] | 1.36 |
| $K_2S_2O_8$ | 0.70 |
| Styrene | 136.50 |

[1] A product of Atlas Powder Company—alkyl aryl sulfonate (anionic surfactant).

Nitrogen gas was sparged into the container and the styrene was added to the ingredients in the container in accordance with the procedure of Example 1 except that the temperature of the contents of the container was maintained at 50° C. instead of the 60° temperature employed in Example 1. After 4 hours, agitation was discontinued and the contents, which consisted essentially of an aqueous suspension of 53.7 weight percent of polystyrene particles, were removed. The particle size of a representative sample of the polystyrene particles was determined in accordance with the procedures previously described. The particle size of the polymer particles was substantially 2,560 A. The ratio of weight diameter to average number diameter was 1.002, indicating that substantially all of the particles had a particle size within the range of 2,540 to 2,580 A.

Example 4

The procedure of Example 3 was repeated except that 1.50 grams of Ultrawet K was employed in place of the 1.36 grams of G–3300 of that example. By so proceeding an aqueous suspension consisting of 53.6 weight percent of polystyrene particles having a substantially uniform particle diameter of 2,850 A. was obtained, the particle size determinations being made in accordance with the procedure in Example 1 described. The average weight diameter: average number diameter ratio was 1.001, indicating that all or substantially all of the particles had a diameter between 2,840 and 2,860 A. The suspension was brilliantly multi-hued when exposed to light. The procedure of Example 4 differed from Example 1 only in the temperature used and the particle size was significantly smaller when the higher temperature of Example 1 was employed.

Example 5

The procedure of Example 3 was repeated except that 2.0 grams of a sodium alkylbenzesulfonic acid, sold under the name of Ultrawet DS, a trademark of Atlantic Refining Co., was employed in place of the G–3300 employed in that Example. By so proceeding an aqueous suspension consisting substantially of 51.5 weight percent of polystyrene particles having a diameter of 1,900 A., determined as previously described, was obtained. The weight diameter: average number diameter ratio was 1.003, indicating that all or substantially all of the particles had particle diameters within the range of 1,880 and 1,920 A. The aqueous suspension was multi-hued in ordinary light.

Example 6

The procedure of Example 3 was repeated except that 5.4 grams of Benax 2Al, an anionic detergent consisting of sodium dodecyl phenyl ether disulfonate was employed in place of the G 3300 employed in that example. (Benax is a trademark of Dow Chemical Co.) By so proceeding an aqueous suspension of polystyrene particles having a particle diameter of 1,080 A. was obtained. The weight diameter:average number diameter ratio was 1,038, determined as described in Example 1, indicating that all or substantially all of the polystyrene particles had a diameter between 1,050 and 1,110 A.

Example 7

The procedure of Example 3 was repeated except that 1.5 grams of an anionic detergent consisting of the dihexyl ester of sulfo-succinic acid, sold under the trademark "Aerosol MA" by American Cyanamid Corporation, was employed instead of the 1.36 grams of G 3300 employed in Example 3. An aqueous suspension consisting substantially of 53.6 weight percent of polystyrene particles having a particle size determined as previously described of 3,350 A. was obtained. The particles exhibited excellent uniformity when observed under the electron microscope, and the suspension was multi-hued in ordinary light.

Example 8

To the container described in Example 1 there were added the following ingredients in the order listed.

| Ingredients | Parts by wt. (grams) |
| --- | --- |
| Water | 112.00 |
| Triton X–114 | 4.00 |
| Ultrawet K | 1.50 |
| $K_2S_2O_8$ | 0.70 |
| Styrene | 136.50 |

Emulsion polymerization was conducted in accordance with the procedure described in Example 1. After completion of the polymerization 255 grams of an aqueous suspension consisting substantially of 53.6 weight percent of polystyrene particles was obtained. The particle diameter of the styrene particles was 2,700 A. The weight diameter:average number diameter ratio was 1.0000, indicating that all or substantially all of the particles in the suspension had a diameter of 2,700 A. The suspension was brilliantly multi-hued.

Example 9

An aqueous suspension of butylacrylate-styrene-copolymer particles was prepared in the following manner: To the container of Example 1 there were added the following ingredients in the order and amounts listed.

| Ingredients: | Parts by wt. (grams) |
| --- | --- |
| Water | 330.00 |
| Triton X–114 | 12.00 |
| Aerosol MA | 4.50 |
| $K_2S_2O_8$ | 2.10 |
| Butylacrylate | 165.00 |
| Styrene | 165.00 |

The butylacrylate and styrene were charged to the container after the first four ingredients had been added and while these were vigorously agitated under the process conditions described in Example 1. Polymerization was carried on over a 6-hour period and the temperature of the contents of the vessel was maintained at 60±2° C. for 8 hours. Thereafter agitation was stopped and the resulting aqueous suspension was removed from the container. The aqueous suspension obtained consisted substantially of 48.7 weight percent butylacrylate-styrene-copolymer particles having a substantially uniform particle size of 1,760 (±20) A. The suspension was multi-hued.

Example 10

An aqueous suspension of isoprene-styrene-copolymer particles was prepared as follows:

To the container of Example 1 there were added the following ingredients in the amounts listed.

| Ingredient: | Parts by wt. (grams) |
| --- | --- |
| Water | 110.0 |
| Triton X–100 | 4.0 |
| Ultrawet K | 0.5 |
| $K_2S_2O_8$ | 0.7 |
| Styrene | 66.0 |
| Isoprene | 44.0 |

The isoprene and styrene monomers were simultaneously charged to the container after the first four of the above-listed ingredients had been added and while the contents of the container were vigorously agitated. Polymerization was carried out over a 6-hour period, during which time agitation was continued and the temperature of the contents of the container was maintained at 65° C. After 6 hours, agitation was stopped and the resulting aqueous suspension of styrene-isoprene-copolymer particles was removed from the container. The aqueous suspension consisted substantially of 48.9% of styrene-isoprene-copolymer particles having a particle size of 2,000 A. as determined by the procedure described in Example 1. The aqueous suspension of polymer particles was brilliantly multi-hued, giving a further visual indication that the particles were monodisperse.

When butadiene is substituted for isoprene, a monodisperse suspension of styrene-butadiene-copolymer particles is obtained.

Example 11

This example is an embodiment of a process of this invention by which it is possible to preselect or predetermine the particle size of the polymer particles for a particular emulsion polymerization system.

Four emulsion polymerizations were conducted according to the procedure of Example 1 by adding the following ingredients in the order and amounts listed below, using containers substantially identical to the container described in Example 1.

| Ingredient | Composition number (parts by wt.) (grams) | | | |
|---|---|---|---|---|
| | 1 | 2 | 3 | 4 |
| Water | 336.00 | 336.00 | 336.00 | 336.00 |
| Triton X-100 | 12.50 | 12.50 | 12.50 | 12.50 |
| Ultrawet K | 4.50 | 1.23 | 0.82 | 0.40 |
| $K_2S_2O_8$ | 2.10 | 2.10 | 2.10 | 2.10 |
| Styrene | 409.50 | 409.50 | 409.50 | 409.50 |
| Particle Size (A.) | 2,120 | 2,620 | 2,890 | 3,400 |

The emulsion polymerization procedures were substantially identical with the emulsion polymerization procedure described in Example 1. Aqueous suspensions of polystyrene polymer particles were obtained having the above-noted particle sizes. The suspensions were monodisperse and the particle sizes were determined using the procedures described in Example 1. All suspensions were multi-hued.

When the diameters of the particle sizes of the particles of the above-described aqueous suspensions were plotted against the polymerizable liquid:anionic surfactant (e.g., sodium dodecyl benzene sulfonate), employed in the respective polymerizations, on logarithm graph paper, a straight line plot was obtained from which the following mathematical expression was derived.

$$\log D = \log K + \log R^x$$

where D is the polymer particle diameter, R is the polymerizable liquid (e.g., styrene):anionic surfactant (e.g., sodium dodecyl benzene sulfonate), weight ratio K is a constant, and $x$ is the slope of the resulting plot.

From the foregoing it is evident that (1) by maintaining otherwise substantially constant conditions (e.g., specific temperature, specific anionic surfactant, specific non-ionic surfactant, and specific monomer) and (2) correlating the particle diameter (D) with the polymerizable liquid:anionic surfactant weight ratio (R) from the plotted logarithms of the four emulsion polymerizations of Example 11, a substantially linear plot is obtained. By extrapolation and/or interpolation along the linear plot the preselected particle diameter (D) is obtainable for a given weight ratio (R). This particle diameter may be read directly from the plot, thereby enabling one skilled in the art to preselect or predetermine the particle size of the polymer particle desired.

Although Example 11 is directed to styrene, other particular emulsion polymerization ssytems utilizing other specific polymerizable liquids can be employed to prepare aqueous suspensions of monodisperse polymer particles in which the particle size can be preselected.

The reasons for the above proportionality are not known with certainty and there is no intention to be bound by theory. However, it is believed that the presence of the relatively small quantity of anionic surfactant permits uniformity of surfactant micelles prior to the addition of the monomer and a rapid and uniform nucleation of the polymerizable liquid, when it is added to and dispersed in the aqueous medium, results in monodisperse aqueous suspensions. It is further believed that the addition of non-ionic surfactant within the above-described ranges and having a hydrophile-lypophile balance between 10 and 15 prevents the formed polymer particles, which are colloidal, from coalescing and/or forming gels. If these particles were to form gels, their utility would be substantially lessened or destroyed.

While the present invention relates to the production of aqueous suspensions of polymer particles having uniform particles size, it is to be understood that other ingredients such as protective colloids, plasticizers for reducing the film-forming temperature of the polymer particles, buffer salts and the like, conventionally used in processes for the preparation of latices, may be present during the polymerization without affecting the character of the final suspension or latex; provided, however, that such ingredients are used in concentrations conventional in emulsion polymerization art.

The above processes may be carried out batch-wise or in a continuous manner. When carried out continuously, an aqueous medium containing water, an anionic surfactant, a non-ionic surfactant, an initiator and the polymerizable liquid are continuously and simultaneously fed, with agitation, through a zone containing suitable temperature controls in amounts and at rates sufficient to provide a final aqueous suspension having a total solids content and the particle size desired. In such processes it is generally necessary to cool the emulsion due to the exotherm produced by the polymerization.

What is claimed is:

1. In a process wherein a quantity of water emulsifiable, polymerizable organic liquid having carbon-carbon unsaturation is polymerized in disperse state in a volume of aqueous medium containing an anionic surfactant and a non-ionic surfactant under emulsion polymerization conditions for forming a suspension having a continuous aqueous phase and from about 30 to about 60 weight percent, basis the weight of the suspension, of a disperse phase consisting essentially of polymer particles, the improvement for making said polymer particles of virtually uniform diameter (D) between about 750 and about 5000 A., which comprises:

(i) establishing an emulsion of a polymerizable liquid having a solubility in water of about one percent or less and wherein said ionic surfactant is present in a concentration sufficient to provide in said aqueous medium, after the dispersion therein of said polymerizable liquid, a polymerizable liquid:anionic surfactant weight ratio (R) between about 20:1 and about 1200:1 and between about 1 and about 4 weight percent, basis the weight of said suspension, of said non-ionic surfactant, said non-ionic surfactant having a hydrolipophile balance between about 10 and about 15;

(ii) simultaneously heating the total quantity of said emulsion at a temperature in the range of between about 45° C. and about 75° C., thereby forming an aqueous suspension of polymer particles of virtually uniform diameter (D).

2. The process of claim 1 wherein the diameter of the resulting polymer particles is regulated by the establishment of said ratio (R) in the direction of the particle size desired, and said polymerization is conducted at a temperature between about 45° C. and 75° C.

3. The process of claim 1 wherein the diameter of the resulting polymer particles is regulated by the establishment of said temperature within said range in the direction opposite from the particle diameter desired.

4. The process of claim 2 wherein the polymer particle diameter (D) is preselected by:

(a) plotting the logarithms of a plurality of corresponding experimental values of (D) and (R) obtained under otherwise substantially constant conditions, thereby obtaining a substantially linear plot, (b) adjusting (R) in said emulsion to the ratio of a point on said plot wherein (R) is coordinate with preselected particle diameter (D), and (c) polymerizing said emulsion.

5. The process of claim 2 wherein said weight ratio (R) is between about 50:1 to about 1200:1.

6. The process of claim 1 wherein the polymerizable organic liquid is a monomer.

7. The process of claim 6 wherein the polymerizable organic liquid is a hydrocarbon having conjugated olefinic unsaturation.

8. The process of claim 6 wherein the polymerizable liquid is an alkyl ester of an $\alpha,\beta$-unsaturated carboxylic acid.

9. The process of claim 1 wherein the polymerizable liquid is styrene.

10. The process of claim 1 wherein the polymerizable liquid is a mixture of at least two monomers selected from the group consisting of styrene, butadiene, isoprene, and butylacrylate.

11. The process as in claim 10 wherein the polymerizable liquid is a mixture of styrene and butylacrylate.

12. The process of claim 10 wherein the polymerizable liquid consists of a mixture of styrene and isoprene.

References Cited

UNITED STATES PATENTS

| | | |
|---|---|---|
| 3,226,375 | 12/1965 | Greth et al. |
| 3,242,121 | 3/1966 | Hill. |
| 3,294,727 | 12/1966 | Grommers et al. |

SAMUEL H. BLECH, *Primary Examiner.*

W. J. BRIGGS, Sr., *Assistant Examiner.*

U.S. Cl. X.R.

260—29.7, 88.7, 83.7, 85.5, 86.7, 89.3, 89.5, 93.5